United States Patent
Ho

(10) Patent No.: US 12,422,253 B2
(45) Date of Patent: Sep. 23, 2025

(54) THREE-DIMENSIONAL CONTOUR MEASUREMENT SYSTEM

(71) Applicant: TRIPLE WIN TECHNOLOGY(SHENZHEN) CO. LTD., Shenzhen (CN)

(72) Inventor: Hsuan-Wei Ho, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 129 days.

(21) Appl. No.: 18/406,419

(22) Filed: Jan. 8, 2024

(65) Prior Publication Data

US 2025/0180347 A1 Jun. 5, 2025

(30) Foreign Application Priority Data

Dec. 5, 2023 (CN) .......................... 202311665227.3

(51) Int. Cl.
*G01B 11/24* (2006.01)

(52) U.S. Cl.
CPC ................................ *G01B 11/2441* (2013.01)

(58) Field of Classification Search
CPC .................................................. G01B 11/2441
See application file for complete search history.

(56) References Cited

U.S. PATENT DOCUMENTS

| | | | |
|---|---|---|---|
| 2005/0136819 A1* | 6/2005 | Kriesel | A01K 29/00 452/157 |
| 2009/0123058 A1* | 5/2009 | Ito | G06T 7/0006 250/311 |

* cited by examiner

*Primary Examiner* — Seung C Sohn
(74) *Attorney, Agent, or Firm* — ScienBiziP, P.C.

(57) ABSTRACT

Disclosed in the present application is a three-dimensional (3D) contour measurement system. The 3D contour measurement system includes a light source unit, an image acquisition unit, and a control device. The light source unit emits light beam, the light source modulation unit modulates the light beam into a structured light with a preset frequency. The image acquisition unit acquires a stripe image of the object. The control device processes the stripe image to obtain a spectral image, obtains a first phase corresponding to a first structured light, a second phase corresponding to the second structured light, and an equivalent phase corresponding to the structured light based on the spectral region, and obtains a contour height of the object based on the first phase, the second phase, and the equivalent phase.

18 Claims, 11 Drawing Sheets

THREE-DIMENSIONAL CONTOUR MEASUREMENT SYSTEM

FIELD

The present disclosure relates to the technical field of measurement technology, and specifically to a three-dimensional (3D) contour measurement system.

BACKGROUND

Measurement devices that measure three-dimensional (3D) data of objects can be easily affected by external factors such as the environment, which in turn affects the measurement results. For example, when the light intensity of the ambient light is strong, the ambient light may interfere with the formation of the diffraction fringes, and the image of the diffraction fringes acquired by a camera device that carries the phase information of the object may not be sufficiently complete, and the accuracy of the obtained measurement data may be reduced. Another example is that when scanning an object with a hand-held detector with a low-power light source, the scanning light is unstable due to the movement of the hand, which reduces the repeatability of the accuracy. After repeated scanning of the object, after analyzing all the scanned data, the data obtained from repeated scanning may not compensate for the errors in each scan, and the accuracy of the measurement data obtained may be reduced.

Therefore, improvement is desired.

DETAILED DESCRIPTION

In the description of the embodiments of the present disclosure, the technical terms "first," "second," and the like are only used to distinguish different objects, and are not to be construed as indicating or implying relative importance, or implicitly specifying the number, specific order, or primary-secondary relationship of the indicated technical features. In the description of the embodiments of the present disclosure, "more than one" means more than two, unless otherwise expressly and specifically limited.

In the embodiments of the present application, the terms "exemplary" or "for example" are used to denote examples, illustrations, or descriptions, any embodiment or design solution described as "exemplary" or "for example" in the embodiments of the present application should not be construed as being preferred or advantageous over other embodiments or design solutions. The use of the terms "exemplary" or "for example" is intended to present the concepts in a concrete manner.

The following is a brief description of the relevant technologies.

Measurement systems or measurement devices that measure three-dimensional data of objects are easily affected by external factors such as the environment, which in turn affects the measurement results. For example, when the light intensity of the ambient light is too strong, it interferes with the formation of the diffraction fringes, and the image of the diffraction fringes acquired by a camera device that carries the phase information of the object is not sufficiently complete, and the accuracy of the obtained measurement data is reduced. Another example is that when scanning an object with a hand-held detector with a low-power light source, the scanning light is unstable due to the movement of the hand, which reduces the repeatability of the accuracy. After repeated scanning of the object, after analyzing all the scanned data, the data obtained from repeated scanning could not compensate for each other's errors, and the accuracy of the measurement data obtained is reduced.

In order to solve the above problems, the present application provides a three-dimensional contour measurement system to improve the accuracy of measuring a three-dimensional contour of an object.

Embodiments of the present disclosure are further described below in conjunction with the accompanying drawings.

Figure 1:
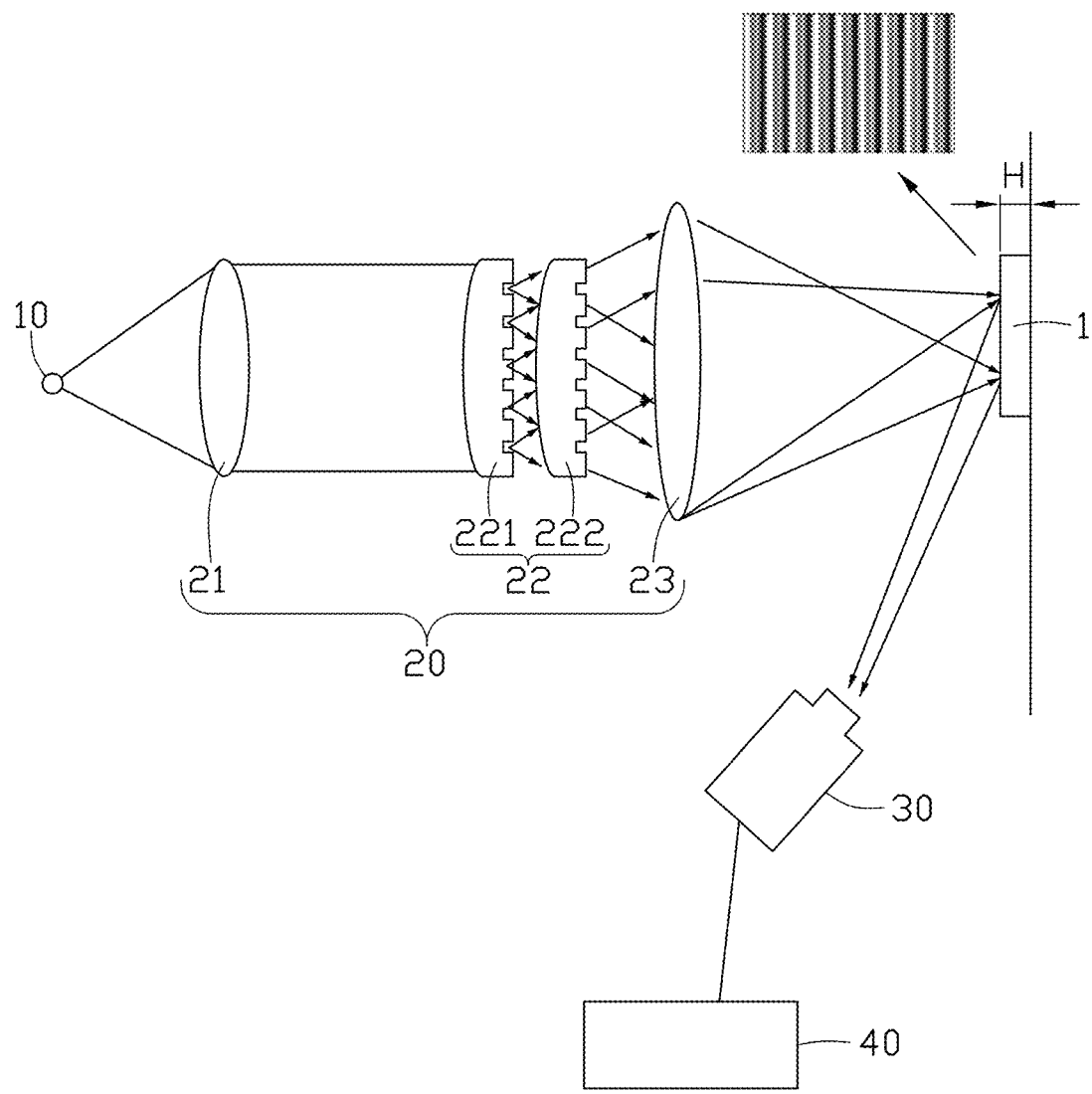
FIG. 1 is a schematic diagram illustrating a three-dimensional (3D) contour measurement system according to an embodiment of the present disclosure.

FIG. 1 illustrates a three-dimensional (3D) contour measurement system 100 in accordance with an embodiment of the present disclosure.

The 3D contour measurement system 100 includes a light source unit 10, a light source modulation unit 20, an image acquisition unit 30, and a control device 40.

The light source unit 10 is used to emit a light beam. In some embodiments, the light source unit 10 is a laser device, and the light beam emitted by the light source unit 10 is a laser. The laser emitted by the light source unit 10 has a higher optical power than the light beam emitted by a digital light processing (DLP) or a liquid crystal on silicon (LCOS), which is LED light. A beam with more optical power is less susceptible to external factors, such as being more unaffected by ambient light and movement of the position of the light source unit 10. When scanning a large object, each part of the object needs to be scanned in turn due to the large size of the object, so the light source unit 10 needs to move its position to change the projection direction. Therefore, the laser with stronger optical power, which is not affected by the movement of the position of the light source unit 10, is able to emit a more stable laser. When scanning the same part of an object repeatedly, the data obtained from repeated scans with a more stable laser can compensate for each other's errors, resulting in more accurate measurement data.

When scanning objects with a low tone (such as black) or high reflectivity, even if the laser with higher optical power is absorbed by the object with low color tone or reflected by the object with high reflection, more information about the 3D contour of the object can be scanned without the need to powder coat the surface of the object beforehand. Since more information about the 3D contour is obtained per unit of spatial scanning, the reconstructed 3D object has a higher resolution.

The light source modulation unit 20 is used to modulate the light beam emitted by the light source unit 10 into a structured light with a preset frequency and project the structured light onto an object to form multiple interference fringes on the surface of the object. The light source modulation unit 20 includes a collimator 21, a frequency modulation unit 22, and a light source projection unit 23. The light source modulation unit 20 starts with the light source unit 10 and arranges the collimator 21, the frequency modulation unit 22, and the light source projection unit 23 in sequence in accordance with the emission path of the light source unit 10.

The collimator 21 is used to collimate a plurality of light beams into beams that are parallel to each other. The light beams are emitted from the light source unit 10 to the collimator 21, and a plurality of the light beams emanating from the outgoing surface of the collimator 21 are parallel to each other, so as to form an optical field composed of parallel beams.

The frequency modulation unit 22 is used to adjust a plurality of light beams parallel to each other into the structured light with a preset frequency. In some embodiments, the frequency modulation unit 22 includes a plurality of diffractive optical elements (DOEs) arranged in sequence. The outgoing surface of each diffractive optical element is provided with a microstructure, the microstructure is composed of convex portions and concave portions with dimensions smaller than a preset value. In other words, an outgoing surface of the diffractive optical element is provided with a plurality of convex portions and a plurality of concave portions. The microstructure of each diffractive optical element is different, allowing each diffractive optical element to adjust the beam to different frequencies, meaning that each diffractive optical element has a different adjustment frequency. In one embodiment, the frequency modulation unit 22 includes a first diffractive optical element 221 and a second diffractive optical element 222 arranged in sequence. The outgoing surface of the first diffractive optical element 221 is opposite to the incident surface of the second optical element 222. When the beam is emitted from the outgoing surface of the first diffractive optical element 221, the frequency of the beam is adjusted to the first frequency, and the beam is adjusted to the structured light, when the structured light is emitted from the outgoing surface of the second diffractive optical element 222, it is adjusted to the preset frequency. The first diffractive optical element 221 can adjust the frequency of the beam to the first frequency, and the second diffractive optical element 222 can adjust the frequency of the beam to the structured light with the second frequency. When the structured light with the first frequency is emitted from the outgoing surface of the second diffractive optical element 222, the structured light with a first frequency and the structured light with a second frequency can overlap to form a structured light with a preset frequency. The present application modulates the beam into the structured light with a preset frequency through the first diffractive optical element 221 and the second diffractive optical element 222. The control device 40 can analyze the information (such as phase information and period) of the structured light with the first frequency, the information (such as phase information and period) of the structured light with the second frequency, and the information (such as phase information and period) of the structured light with the preset frequency based on the stripe image of the structured light with the preset frequency. The present application can obtain the structured light with multiple frequencies by setting up multiple diffractive optical elements with different microstructures. The structured light with multiple frequencies is stacked to form the structured light with a preset frequency, when the structured light with the preset frequency is projected onto the object 1, which can produce interference fringes of equivalent period (the interference fringes are Moore's fringes). The superposition of the corresponding period of the first frequency and the corresponding period of the second frequency produces interference fringes of equivalent period. The interference fringes are deformed on the surface of the object 1, therefore, by analyzing these deformed fringes, the phase information of the 3D contour of the object 1 can be obtained. Compared to the single frequency structured light emitted by digital light sources, the interference fringes with equivalent periods provide richer phase information and higher measurement accuracy for the 3D contour of the object 1.

As shown in FIG. 1, an outgoing surface of the first diffractive optical element 221 is provided with a plurality of first convex portions and a plurality of first concave portions, and an outgoing surface of the second diffractive optical element 222 is provided with a plurality of second convex portions and a plurality of second concave portions.

The light source projection unit 23 is used to project the structured light onto the object 1. In some embodiments, the light source projection unit 23 is a lens. The image acquisition unit 30 is used to obtain the stripe image of the object 1. The stripe image carries the phase information of the 3D contour in the surface of the object 1. In some embodiments, the image acquisition unit 30 is a camera, more specially, the image acquisition unit 30 can be a charge coupled device (CCD) camera.

The control device 40 is used to obtain phase information of the 3D contour of the object 1 based on the stripe image, and to obtain a contour height of the object 1 based on the phase information. The control device 40 may be a personal computer (PC), a cloud server, a desktop computer, a network server, a service cluster, a handheld computer (PDA), a mobile phone, a wireless terminal device, an embedded device, or other device with data processing capabilities.

Figure 2:
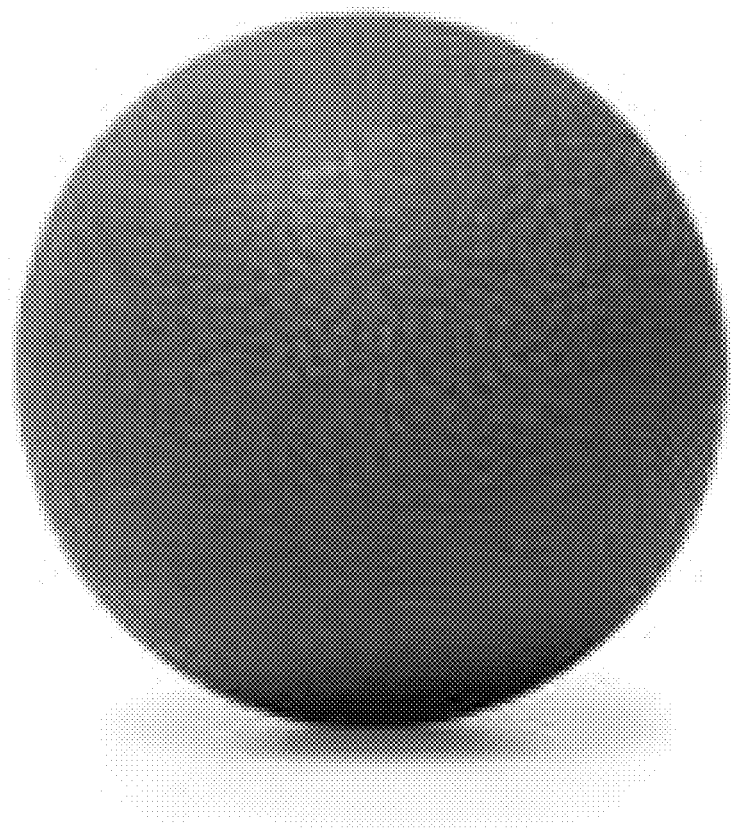
FIG. 2 is an image of an object according to an embodiment of the present disclosure.
Figure 3:
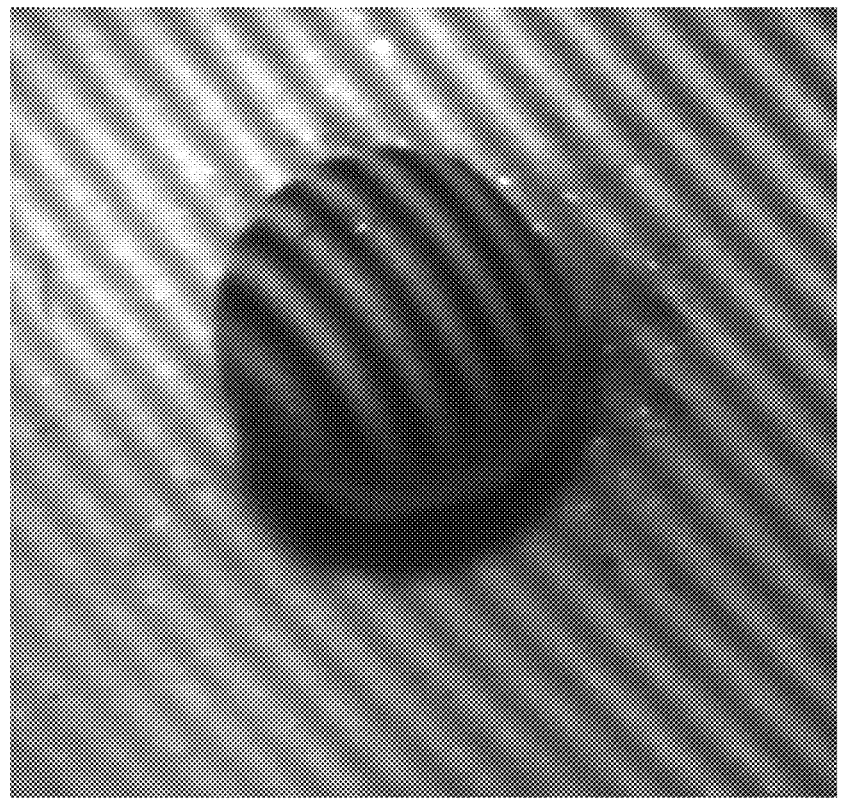
FIG. 3 is a stripe image obtained by an image obtaining unit according to an embodiment of the present disclosure.

In one embodiment, the collimator 21, the first diffractive optical element 221, the second diffractive optical element 222, and the light source projection unit 23 are sequentially arranged in accordance with the emission path of the laser light using the light source unit 10 as a starting point. After the laser light emitted by the light source unit 10 enters the collimator 21, the first diffractive optical element 221, the second diffractive optical element 222, and the light source projection unit 23 in sequence, the light source projection unit 23 projects the structured light with the preset frequency adjusted by the laser light to the object 1 (the shape of the object 1 is shown in FIG. 2). A plurality of interference fringes can be formed on the object 1, and the image acquisition unit 30 acquires the stripe image of the object 1, and the stripe image is shown in FIG. 3.

The control device 40 is used to process the stripe image to obtain a spectral image, the spectral image having a spectral region about the contour of the object 1.

More specifically, the control device 40 generates the following formula (1) based on the deformed stripes in the stripe image:

$$I(x, y) = a(x, y) + b_1(x, y)\cos[2\pi(f_{1x}x + f_{1y}y) + \varphi_1(x, y))] + \\ b_2(x, y)\cos[2\pi(f_{2x}x + f_{2y}y) + \varphi_2(x, y))] + \\ b_3(x, y)\cos[2\pi(f_{3x}x + f_{3y}y) + \varphi_3(x, y))] \quad (1)$$

In the formula (1), (x,y) represents the coordinates of the stripe image, x and y are the numerical values of the columns and rows in the coordinates, respectively; I(x,y) represents the intensity of light, a(x,y) is the average light intensity of the image background, $b_n(x,y)$ is the amplitude of the stripe light intensity change, $[2\pi(f_{nx}x+f_{ny}y)+\varphi_n(x,y))]$ is the carrier phase, $\varphi_n(x,y)$ represents phase information, When n=1, it represents the phase information formed by the structured light with the first frequency, when n=2, it represents the phase information formed by the structured light with the second frequency, and when n=3, it represents the phase information formed by the structured light with the preset frequency.

Formula (1) can be expanded into formula (2).

$$I(x, y) = c_1(x, y)\exp[j\varphi_\alpha(x, y)] + c_1^*(x, y)\exp[-j\varphi_\alpha(x, y)] + \\ c_2(x, y)\exp[j\varphi_\beta(x, y)] + c_2^*(x, y)\exp[-j\varphi_\beta(x, y)] + \\ c_3(x, y)\exp[j\varphi_\gamma(x, y)] + c_3^*(x, y)\exp[-j\varphi_\gamma(x, y)] \quad (2)$$

Figure 4:
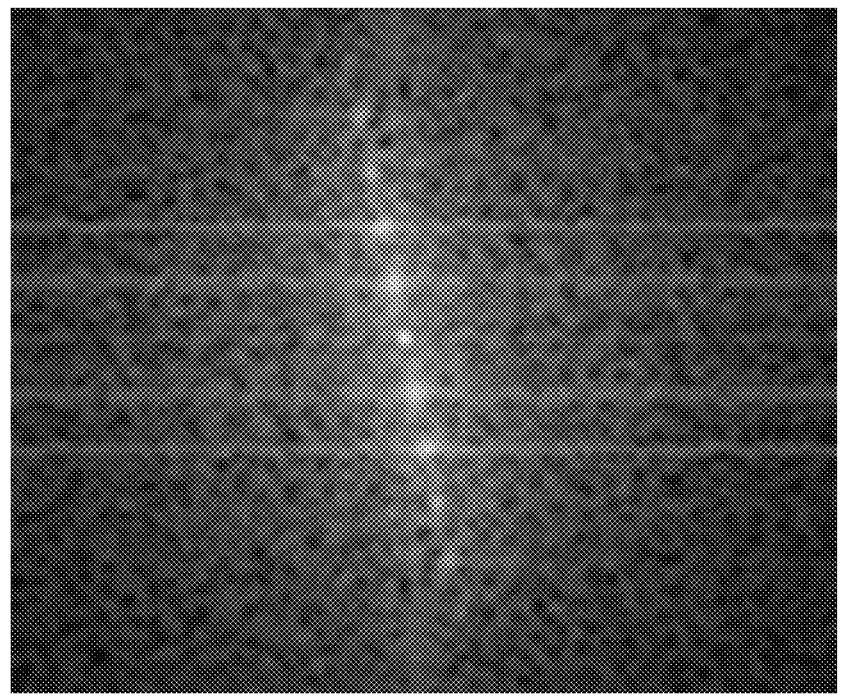
FIG. 4 is a spectral image obtained by transforming the stripe image shown in FIG. 3.

Formula (2) can be transformed by Fourier transform to obtain a spectral image, and the spectral image is shown in FIG. 4. The spectral image includes a spectral region, which is the bright area in FIG. 4. The spectral region carries spectral information, and the spectral information in the spectral region is represented by formula (3).

$$c_n(x, y) = \frac{1}{2}b(x, y)[\cos(\varphi) + j\sin(\varphi)] \quad (3)$$

The control device 40 is used to obtain the spectral information in the spectral region using a filter.

Figure 5:
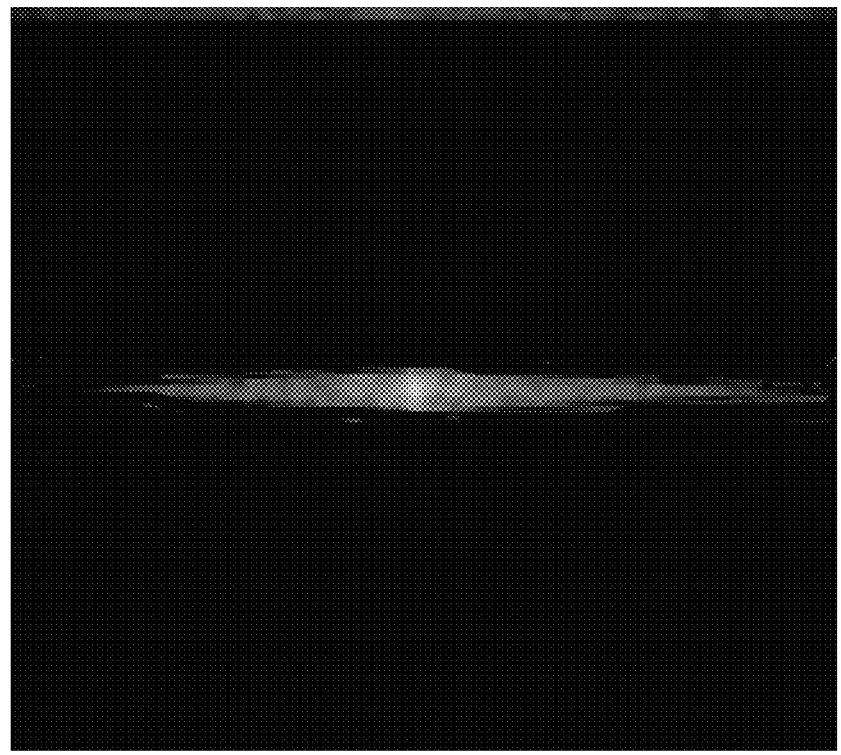
FIG. 5 is an image of an application scenario in which a diamond filter is used to read spectral information of the spectral image shown in FIG. 4.
Figure 6:
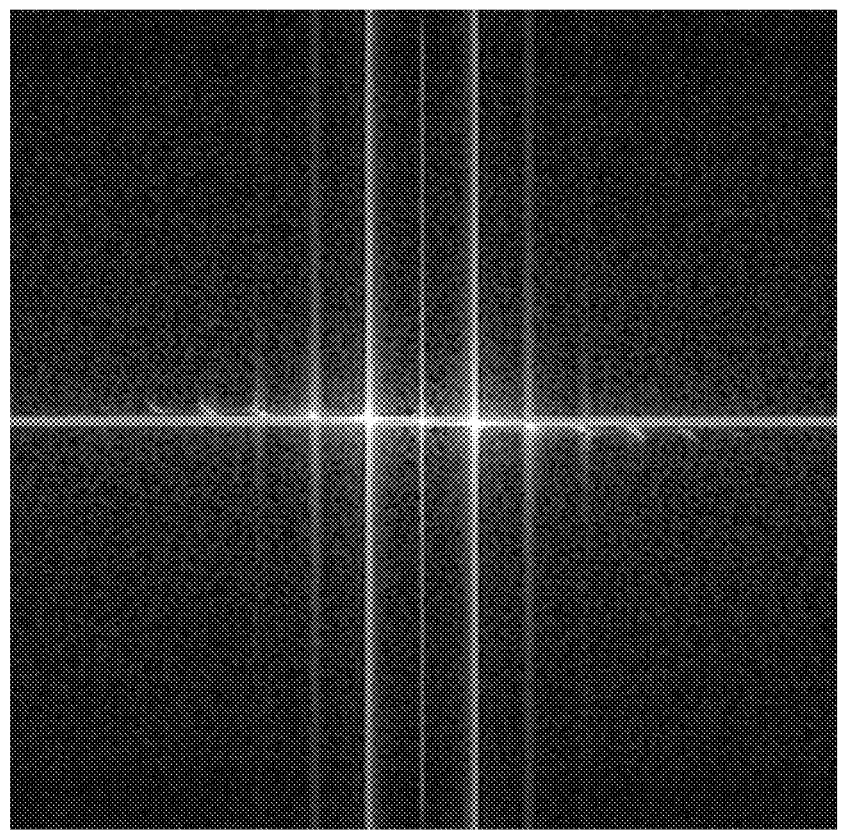
FIG. 6 shows a partially enlarged view of the spectral information shown in FIG. 5.
Figure 7:
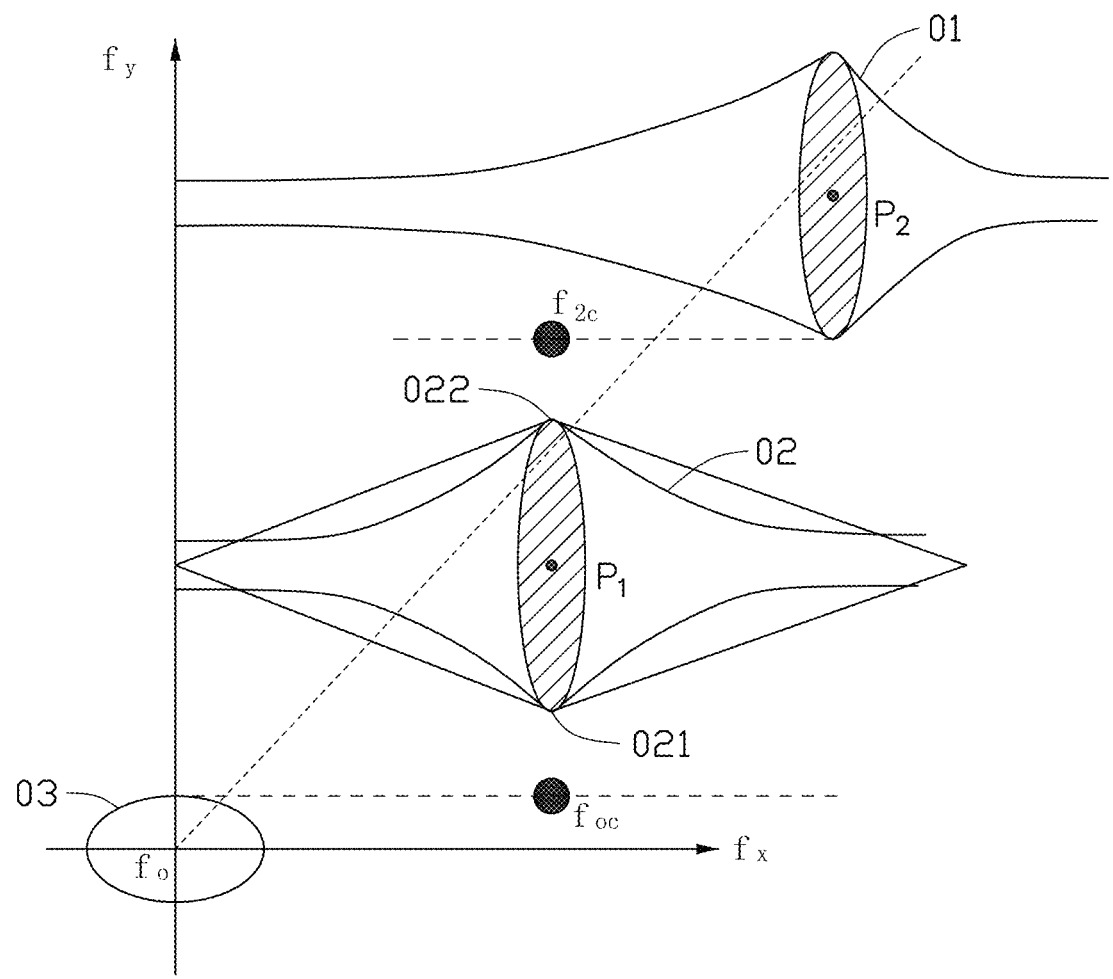
FIG. 7 shows a diagram of another application scenario in which a diamond filter is used to read spectral information of the spectral image shown in FIG. 4.

As shown in FIG. 5, a diamond filter can be used to read the spectral information in the spectral image. FIG. 6 is an enlarged view of the spectral information in FIG. 5. Formula (4) is the Formula for the diamond filter. As shown in FIG. 7, the emission period of the structured light can be calculated based on the adjustment frequency of the first diffractive optical element 221 and the adjustment frequency of the second diffractive optical element 222, and the coordinate point with the largest gray value in the spectral region can be calculated based on the emission period of the structured light, i.e., the spike values $f_0$, $P_1(h_1,k_1)$, and $P_2(h_2,k_2)$. Each spike value represents an area in a spectral region with the largest gray value, i.e., the brightest area in FIG. 6. FIG. 7 illustrates three spectral regions 01, 02 and 03, the region 01 is located below the bottom point 021 of the region 02, and the region 01 is located above the top point 022 of the region 02. The spike value serves as the center of the diamond filter, taking the spike value $P_1(h_1, k_1)$ as an example (the region 02 as an example), the center of the diamond filter is the spike value $P_1(h_1,k_1)$, search for the top point $f_{0c}$ of the region 03 and the bottom point $f_{2c}$ of the region 01. Based on the first direction ($f_y$ direction), the long axis $f_a$ of the diamond filter is a distance from the center of the diamond filter to $f_0$. The short axis $f_b$ of the diamond filter is less than one perpendicular distance from the spike value $P_1$ to $f_{0c}$, and short axis $f_b$ of the diamond filter is and less than one perpendicular distance from the spike value $P_1$ to the bottom point $f_{2c}$, based on the aforementioned principle, the diamond filter satisfies formula (4):

$$\frac{|x-h|}{f_a} + \frac{|y-k|}{f_b} \leq 1, f_b < P_1 f_{0c}, f_b < P_1 f_{2c} \quad (4)$$

h and k are the coordinates of the spike value, x and y are the coordinates of the spectral information in the spectral image, $f_b$ is the short axis of the diamond filter, $f_a$ is the long axis of the diamond filter.

Figure 8:
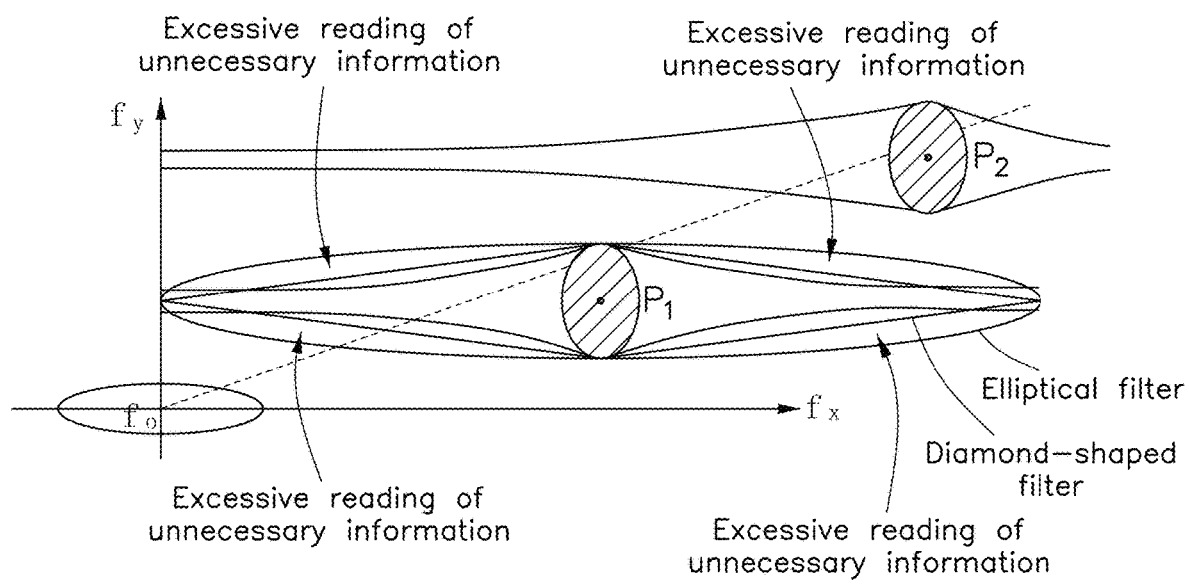
FIG. 8 shows a diagram of an application scenario in which a diamond filter and an ellipse filter are used to read the spectral information of the spectral image shown in FIG. 4.

As shown in FIG. 8, compared to using an elliptical filter, the diamond filter reads less unnecessary information, and the unnecessary information includes non spectral information.

The control device 40 is further used to obtain a first phase of the structured light with the first frequency, a second phase of the structured light with the second frequency, and an equivalent phase of the structured light with the predetermined frequency based on the spectral information.

Figure 9:
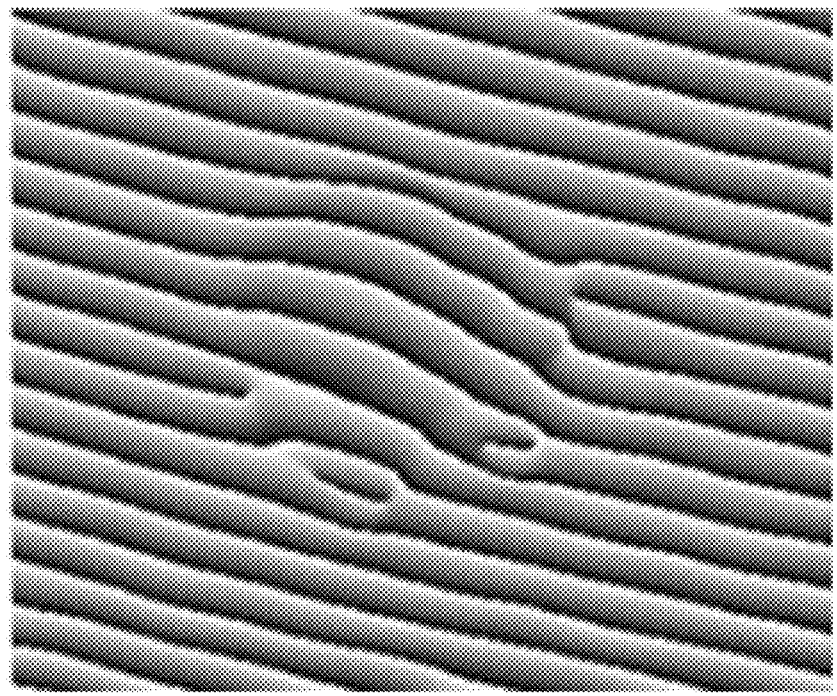
FIG. 9 shows a phase encapsulation obtained by transforming the stripe image shown in FIG. 3.

The spectral information read by the diamond filter is inverse Fourier transformed, and the spectral information of the first frequency, the spectral information of the second frequency, and the spectral information of the preset frequency are converted into the phase information, i.e., the first phase, the second phase, and the equivalent phase of the 3D contour of the object 1 are obtained respectively, and the formulas are as shown in formula (5), formula (6), and formula (7), respectively. The spectral image obtained through inverse Fourier transform is shown in FIG. 9.

$$\varphi_1 = \tan^{-1}\left[\frac{\text{Im}[c1]}{\text{Re}[c1]}\right] \quad (5)$$

$$\varphi_2 = \tan^{-1}\left[\frac{\text{Im}[c2]}{\text{Re}[c2]}\right] \quad (6)$$

$$\varphi_{eq} = \tan^{-1}\left[\frac{\text{Im}[ceq]}{\text{Re}[ceq]}\right] \quad (7)$$

The control device 40 is used to obtain the contour height of the object 1 based on the first phase, the second phase, and the equivalent phase.

In some embodiments, the period of the first phase is compared to the period of the second phase.

The period can be obtained by analyzing the phase information, or the period of the first phase or the period of the second phase can be obtained by directly converting from the adjustment frequency of the diffractive optics.

It is then determined that the height of the first phase or the second phase with the larger period is determined as a reference height. For example, in the embodiment, the period of the second phase is greater than the period of the first phase, and therefore the height corresponding to the second phase is determined as the reference height.

The calculation of the reference height and the equivalent height of the equivalent phase is shown in formula (8):

$$\begin{cases} h_{c2} = -\dfrac{l_0 p_2 \varphi_2(x, y)}{2\pi d} & \text{for } \varphi_2(x, y) = \varphi_2 \\ h_{ceq} = -\dfrac{l_0 p_{eq} \varphi_{eq}(x, y)}{2\pi d} & \text{for } \varphi_{eq}(x, y) = \varphi_{eq} \end{cases} \quad (8)$$

$h_{c2}$ represents the reference height, $h_{ceq}$ represents the equivalent height, d is a distance between the light source unit 10 and the image acquisition unit 30, $l_0$ is a distance between the image acquisition unit 30 and a reference plane, and the reference plane refers to a plane used to calculate the positional relationship between the components of the measurement system 100, $p_2$ is the period correspond to the second phase, $p_{eq}$ is the equivalent period corresponding to the equivalent phase information, $\varphi_2(x,y)$ is the second phase, $\varphi_{eq}(x,y)$ is the equivalent phase information.

After obtaining the reference height and the equivalent height, the control device 40 is used to compare the reference height with a preset break height. If the preset break height is greater than the reference height, the equivalent height is determined to be the contour height. If the preset break height is less than the reference height, the reference height is determined to be the contour height. The preset break height is a true contour height (e.g. H in FIG. 1) of the 3D contour of the object 1, and the preset break height can be measured beforehand and pre-stored to the control device 40.

The principle of interferometric imaging is utilized to measure the 3D contour of the object 1. If the height of the 3D contour of the object 1 is too large for more than a stripe period, the system is unable to measure the height at the position where the height is too large, and the object 1 reconstructed using the measurement data produces a breakpoint at that position. Therefore, when the preset break height is greater than the reference height, the equivalent height is determined to be the contour height, and the selection of the equivalent height with the larger period can enhance the measurement limit value of the surface height of the measurement system 100. When the preset break height is less than or equal to the reference height, it means that the surface height of the object 1 will not exceed the measurement limit value of the system, and determining the reference height as the contour height can improve the resolution.

The control device 40 is used to reconstruct the 3D contour of the object 1 based on the Euler formula, the phase unwrapping techniques and the contour height.

Figure 10:
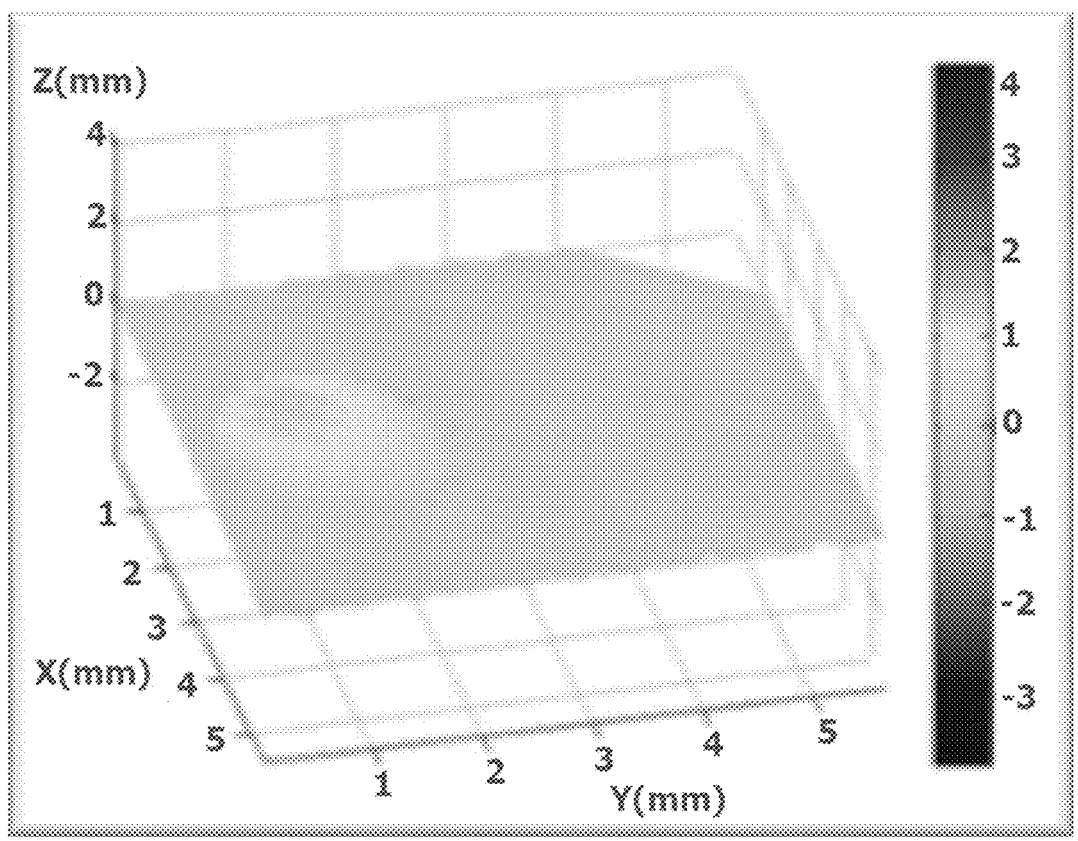
FIG. 10 shows a schematic diagram of reduction of the phase encapsulation shown in FIG. 9 to obtain a 3D contour of an object.
Figure 11:
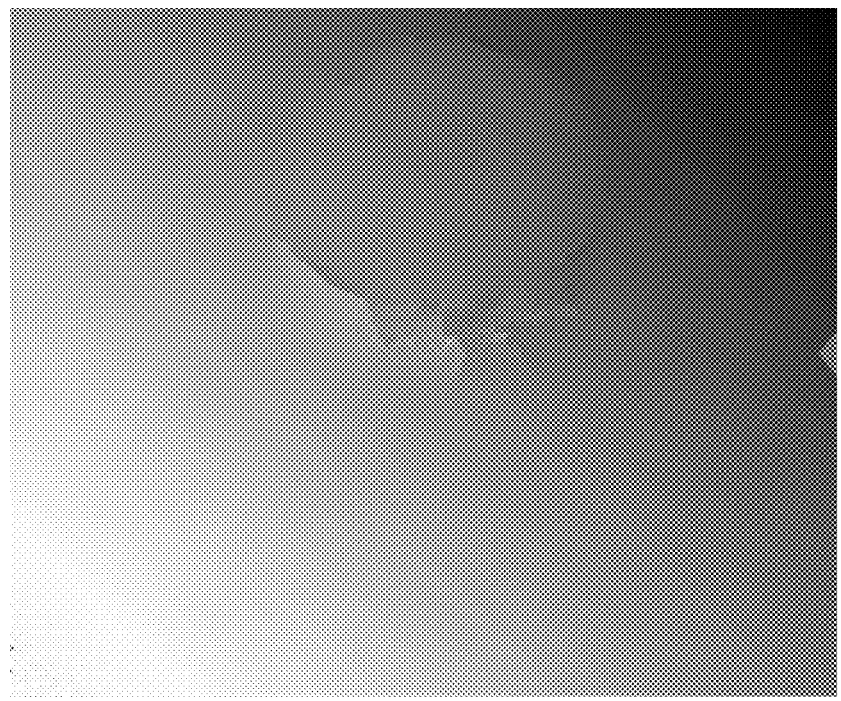
FIG. 11 is an image of a 3D contour of an object after reduction of the phase encapsulation shown in FIG. 9.

Since the tangent function (tan−1) is a discontinuous function, the reduced phase value is a discontinuous state. In order to merge the restored discontinuous states into a continuous phase distribution, it is necessary to use Euler transformation and phase unwrapping techniques to restore the obtained continuous phase, then reconstruct the 3D contour of the object 1, and reconstructed 3D contour of the object 1 is shown in FIGS. 10 and 11.

In the embodiment, the light source modulation unit 20 can modulate the beam into the structured light with the first frequency and the structured light with the second frequency, stack the structured light with the first frequency and the structured light with the second frequency into the structured light with the preset frequency. The interference fringes generated when the structured light with the preset frequency is projected onto an object. The interference fringes with the preset frequency makes the phase information on the surface of the object 1 richer and the measured object more accurate. In other words, the control device 40 obtains the first phase corresponding to the structured light with the first frequency, the second phase corresponding to the structured light with the second frequency, and the equivalent phase corresponding to the structured light with the preset frequency based on the stripe image with the preset frequency. The control device 40 may obtain a higher accuracy of the contour height of the object 1 based on the first phase, the second phase and the equivalent phase.

The embodiment of the present application, comparative example 1 and comparative example 2 can be compared according to the following comparison conditions, and the comparison results can be organized as shown in Table 1 below. The comparison conditions include the number of images to be obtained, average error percentage, low segment difference reconstruction, and high segment difference reconstruction. The number of images to be obtained refers to the number of images that need to be measured for the object 1 when constructing the 3D contour of the object 1. The average error percentage refers to the average error in the contour height between the measured 3D contour of the object 1 and the actual 3D contour of the object 1. The low segment difference reconstruction refers to the reconstruction results of the upper surface and the lower surface of the brake height when the brake height of the object 1 is lower than a preset height. The high segment difference reconstruction refers to the reconstruction results of the upper surface and the lower surface of the brake height when the brake height of the object 1 is higher than a preset height.

Comparative example 1 refers to the method of obtaining the 3D contour of the object 1 being measured using DLP as the light source unit 10, combined with optical phase shifting method.

Comparative example 2 differs from the present embodiment in that the light source unit 10 of comparative example 2 is a DLP, the light source modulation unit 20 is different, and the filter used is an elliptical filter.

TABLE 1

| Method | Number of images to be obtained | Average error percentage | Low segment difference reconstruction | High segment difference reconstruction |
|---|---|---|---|---|
| Comparative example 1 | 4 | 2.45% | Reconstructible | Irreconstructible |
| Comparative example 1 | 1 | 3.20% | Reconstructible | Reconstructible |
| The embodiment | 1 | 1.50% | Reconstructible | Reconstructible |

As can be seen from Table 1, the error percentage in the 3D contour of the object 1 obtained from the measurement in accordance with the present embodiment is lower, and both the low segment difference and the high segment difference can be reconstructed, indicating that compared to comparative example 1 and comparative example 2, the measurement accuracy of this implementation method is higher. At least 4 images need to be read for comparative example 1 to reconstruct, making it more susceptible to environmental interference and resulting in a larger average error. Since the use of a single frequency Fourier transform algorithm in the phase shift method, the structured light projected onto the object has only one frequency, making it impossible to reconstruct the contour height of the object that is higher than a preset height. The use of elliptical filter for comparative example 2 reads unnecessary information and has a larger average error. Comparative examples 1 and 2 use DLP as the light source unit to emit beams with less light intensity than the light source unit 10 of the embodiment of the present application, which also makes the average error greater than that of the embodiment of the present application.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A three-dimensional (3D) contour measurement system comprising:
    a light source unit configured to emit light beams,
    a light source modulation unit configured to modulate the light beams into a structured light with a preset frequency, and project the structured light with the preset frequency onto an object to form interference fringes on a surface of the object, wherein the structured light with the preset frequency is formed by superposing a first structured light with a first frequency and a second structured light with a second frequency,
    an image acquisition unit configured to acquire a stripe image of the object;
    a control device configured to process the stripe image to obtain a spectral image, the spectral image comprising a spectral region of a surface contour of the object; the control device further configured to obtain a first phase corresponding to the first structured light with the first frequency, a second phase corresponding to the second structured light with the second frequency, and an equivalent phase corresponding to the structured light with the preset frequency based on the spectral region; and
    the control device further configured to obtain a contour height of the object based on the first phase, the second phase, and the equivalent phase.

2. The 3D contour measurement system of claim 1, wherein the light beam emitted by the light source unit is a laser.

3. The 3D contour measurement system of claim 1, wherein the light source modulation unit comprises a collimator and a frequency modulation unit, the collimator is configured to collimate the light beams emitted by the light source unit into parallel light beams, and the frequency modulation unit is configured to adjust the parallel light beams into the structured light with the preset frequency.

4. The 3D contour measurement system of claim 3, wherein the light source modulation unit further comprises a light source projection unit, and the light source projection unit is configured to project the structured light with the preset frequency onto the object.

5. The 3D contour measurement system of claim 4, wherein the frequency modulation unit comprises a first diffractive optical element and a second diffractive optical element, the first diffractive optical element is configured to adjust the parallel light beams into the first structured light with the first frequency, the second diffractive optical element is configured to adjust the first structured light with the first frequency into the structured light with the preset frequency; the second diffractive optical element is further configured to adjust the parallel light beams into the second structured light with the second frequency, and the structured light with the preset frequency is formed by superposing the first structured light with the first frequency and the second structured light with the second frequency.

6. The 3D contour measurement system of claim 1, wherein the control device is further configured to compare a first period of the first phase and a second period of the second phase, determine a height of the first phase or a height of the second phase with a larger period as a reference height, and obtain the contour height of the object based on the reference height and an equivalent height of the equivalent phase.

7. The 3D contour measurement system of claim 6, wherein the control device is further configured to compare the reference height with a preset break height, and determine the equivalent height is the contour height of the object if the preset break height is greater than the reference height.

8. The 3D contour measurement system of claim 7, wherein the control device is further configured to determine the reference height is the contour height of the object if the preset break height is less than or equal to the reference height.

9. The 3D contour measurement system of claim 6, wherein the control device is further configured to obtain the reference height based on the second phase, a first distance between the light source unit and the image acquisition unit, a second distance between the image acquisition unit and a reference plane, and the second period corresponding to the second phase, and obtain the equivalent height based on the equivalent phase, the first distance, the second distance, and an equivalent period.

10. The 3D contour measurement system of claim 1, wherein the control device is further configured to obtain spectral information within the spectral region using a filter, and obtain the first phase corresponding to the first structured light with the first frequency, the second phase corresponding to the second structured light with the second frequency, and the equivalent phase corresponding to the structured light with the preset frequency based on the spectral information.

11. A three-dimensional (3D) contour measurement system comprising:
    a light source unit configured to emit light beams,
    a light source modulation unit configured to modulate the light beams into a structured light with a preset frequency, and project the structured light with the preset frequency onto an object to form interference fringes on a surface of the object, wherein the structured light with the preset frequency is formed by superposing a first structured light with a first frequency and a second structured light with a second frequency,
    an image acquisition unit configured to acquire a stripe image of the object;
    a control device configured to process the stripe image to obtain a spectral image, the spectral image comprising a spectral region of a surface contour of the object; the control device further configured to obtain a first phase corresponding to the first structured light with the first frequency, a second phase corresponding to the second structured light with the second frequency, and an equivalent phase corresponding to the structured light with the preset frequency based on the spectral region; and
    the control device further configured to obtain a contour height of the object based on the first phase, the second phase, and the equivalent phase,
    wherein the light beam emitted by the light source unit is a laser, and the control device is further configured to obtain spectral information within the spectral region using a filter, and obtain the first phase corresponding to the first structured light with the first frequency, the second phase corresponding to the second structured light with the second frequency, and the equivalent phase corresponding to the structured light with the preset frequency based on the spectral information.

12. The 3D contour measurement system of claim 11, wherein the light source modulation unit comprises a collimator and a frequency modulation unit, the collimator is configured to collimate the light beams emitted by the light source unit into parallel light beams, and the frequency modulation unit is configured to adjust the parallel light beams into the structured light with the preset frequency.

13. The 3D contour measurement system of claim 12, wherein the light source modulation unit further comprises a light source projection unit, and the light source projection unit is configured to project the structured light with the preset frequency onto the object.

14. The 3D contour measurement system of claim 13, wherein the frequency modulation unit comprises a first diffractive optical element and a second diffractive optical element, the first diffractive optical element is configured to adjust the parallel light beams into the first structured light with the first frequency, the second diffractive optical element is configured to adjust the first structured light with the first frequency into the structured light with the preset frequency; the second diffractive optical element is further configured to adjust the parallel light beams into the second structured light with the second frequency, and the structured light with the preset frequency is formed by superposing the first structured light with the first frequency and the second structured light with the second frequency.

15. The 3D contour measurement system of claim 11, wherein the control device is further configured to compare a first period of the first phase and a second period of the second phase, determine a height of the first phase or the second phase with a larger period as a reference height, and obtain the contour height of the object based on the reference height and an equivalent height of the equivalent phase.

16. The 3D contour measurement system of claim 15, wherein the control device is further configured to compare the reference height with the preset break height, and determine the equivalent height is the contour height of the object if the preset break height is greater than the reference height.

17. The 3D contour measurement system of claim 16, wherein the control device is further configured to determine the reference height is the contour height of the object if the preset break height is less than or equal to the reference height.

18. The 3D contour measurement system of claim 17, wherein the control device is further configured to obtain the reference height based on the second phase, a first distance between the light source unit and the image acquisition unit, a second distance between the image acquisition unit and a reference plane, and the second period corresponding to the second phase, and obtain the equivalent height based on the equivalent phase, the first distance, the second distance, and an equivalent period.

* * * * *